3,188,172
PROCESS OF PREVENTING BLUE COLOURATION IN SODIUM CHLORIDE TREATED WITH FERRO- OR FERRICYANIDE COMPOUNDS
Martin Schultze and Karl-August Hölscher, Rheinberg, Rhineland, Germany, assignors to Deutsche Solvay-Werke Gesellschaft mit beschrankter Haftung, Solingen-Ohligs, Germany
No Drawing. Filed Nov. 16, 1962, Ser. No. 238,286
Claims priority, application Germany, Nov. 18, 1961, D 37,493
5 Claims. (Cl. 23—89)

This invention relates to a process of preventing blue colouration in sodium chloride treated with ferro- or ferricyanide compounds.

According to German Patent 954,691 the grains of a saline salt can be prevented from sticking together by an addition of alkali ferrocyanide or alkali ferricyanide. The same compounds can also be used for preventing agglomeration of the particles of ground rock salt. According to the process of the above patent specification the reduction in the caking of sodium chloride is effected by addition of a foreign substance to solid sodium chloride in such manner that a soluble ferro- or ferricyanide or a soluble cadmium salt is added to the solid salt such that the quantity of the foreign salt added to the sodium chloride amounts to less than 0.05%, preferably 0.02 to 0.00002%, i.e., from 200 grams to 0.2 gram per ton, of the sodium chloride.

However, the application of the process to ground rock salt and other salts has great disadvantage. The loose particles of the salt, due to the iron present originally in the salt or introduced during the processing, when exposed to the action of the humidity in air tend to develop a blue colouration which upsets the quality of the product. In the case of saline salt this colouration can almost completely be avoided if, during the purification process, the iron is totally removed together with calcium and magnesium salts. The removal of iron compounds from a ground rock salt is not so easy because at least part of the iron compound remains embedded inside the salt particles.

Several attempts have been made to prevent the blue colouration of the salt by the addition of substances which form stable complex compounds with iron. These compounds include tartaric acid, citric acid, polyphosphates and acylation products of phosphoric acid but their use has not been successful. Also no success can be obtained by adding to the dry or moist rock salt alkaline water-soluble substances such as sodium carbonate, sodium hydroxide or sodium bicarbonate in stoichiometric proportions with respect to the amount of iron cyanide used. The subsequent colouration can even not be prevented by the addition of such amounts of these alkaline compounds to the salt that the normally acid pH-value of the wet rock salt is increased to nearly 7.

It was, therefore, rather unexpected and surprising to find that an addition of alkaline earths silicates or carbonates, i.e., the substances which show only a slight alkaline reaction or none and are only slightly soluble or practically insoluble in water, to a salt, in particular rock salt, which was previously treated with a ferro- or ferricyanide compound and contained soluble iron compounds, prevented the instantaneous subsequent development of the blue colouration in the product. The suitable substances are, for example, calcium silicate, calcium carbonate or magnesium carbonate, in particular, and, when prepared in accordance with Austrian Patent 188,-693, basic magnesium carbonate. According to the process of this Austrian patent, the preparation of a basic magnesium carbonate of large volume from aqueous magnesium salt solutions and carbonates and/or bicarbonates of the alkali metals is effected in two operating stages, the first of which is effected below and the second of which is effected above 55° C. In the first stage the reaction is carried out with continuous stirring of a solution containing 2.5–10 g. magnesium per litre and the equivalent quantity of a carbonate and/or bicarbonate of the alkali metal, until the precipitated jelly-like product is dispersed. The dispersion is then heated above 55° C., but below the boiling point of water, until the conclusion of the development of carbonic acid at which point the precipitated carbonate is filtered, washed and dried. These materials are known as respectively coating agents and powder materials and are added to granular material such as saline salt or rock salt to prevent sticking together with formation of lumps. For this use they must, however, be used in a proportion of at least 1 kg. per ton of salt. Till now these substances have never been used together with ferro- or ferricyanide compounds since it was unknown that an addition of but 50–500 gms./ton to a rock salt treated with iron cyanide compounds, in accordance with German Patent 954,691, is sufficient to prevent the appearance of the blue colouration in the product. The incorporation of alkaline earth silicates and/or carbonates can be carried out in various ways. They can be added before, simultaneously or after the treatment of the salt with alkali ferro- or ferricyanides. Surprisingly good results can be achieved if alkaline earth carbonates and/or silicates are wholly or partly replaced by weak solutions of the very slightly soluble alkaline earth hydroxides such as magnesium hydroxide or calcium hydroxide, or hydroxides can be used in mixtures with alkaline earth carbonates and/or silicates. It has been found that blue colouration can also be prevented if in blending the salt with an alkaline earth hydroxide a stream of carbon dioxide is simultaneously passed through the salt. The very slightly soluble alkaline earth compounds can also be replaced by aluminum hydroxide. Blending of the materials can be carried in various ways, the important thing being to achieve uniform distribution of the agent in the mixture.

The invention will now be further described by way of the examples.

*Example 1*

1 kg. of ground rock salt in a porcelain dish was uniformly sprayed with 20 mg. potassium ferrocyanide and 80 mg. sodium bicarbonate or an equivalent quantity of sodium carbonate. The salt, which originally contained 7.2 g. of iron/ton was brought in contact with pieces of iron wire. The sample was then wetted every 12 hours with 10 ml. water. After five-fold wetting the salt turned blue. Similar test was carried out with 1 kg. of the same salt mixed with 20 mg. potassium ferrocyanide and containing 80 mg. basic magnesium carbonate. The sample remained colourless, even in the vicinity of the iron wires, after 60-fold wetting with 10 ml. of water.

*Example 2*

Further samples were examined having the same composition as described in Example 1 but containing instead of basic magnesium carbonate, calcium silicate, calcium carbonate and magnesium carbonate. All samples remained colourless after a 60-fold wetting with water or only a slight greenish colouration could be observed near the iron wires.

*Example 3*

(a) 1 kg. of salt was treated with 200 mg. magnesium hydroxide (dry), 20 mg. potassium ferrocyanide and iron in the form of wires;

(b) 1 kg. of salt was treated with 260 mg. calcium hydroxide (dry), 20 mg. potassium ferrocyanide, 7 mg. ferric chloride and iron in the form of wires.

The dry powders were blended in a mixing drum and the samples were left in dishes on a laboratory bench. The content of every dish was sprayed twice every hour with 10 ml. of water (i.e., 20 ml. per hour) from a spray-pistol during 60 hours so that the total quantity of water added was 1200 g. No colouration was observed; not even in the sample containing ferric chloride.

*Example 4*

A sample was prepared as described in Example 1 but containing, instead of basic magnesium carbonate a mixture of 40 mg. magnesium carbonate with 40 mg. calcium hydroxide. After a thorough blending a stream of carbon dioxide was passed under constant stirring through the salt. After 60-fold wetting with water no change in colour except for a slight greenish colouration near the wires could be observed in the sample.

*Example 5*

Similar results to those of Example 4 were obtained using 10 mg. aluminium hydroxide, 20 mg. calcium hydroxide, 20 mg. of calcium silicate or of a mixture of calcium silicates, and 25 mg. basic magnesium carbonate, with or without passing carbon dioxide.

*Example 6*

1-ton heaps of rock salt, each treated uniformly with 20 g. potassium ferrocyanide were left outdoors. After two days' exposure the salt in the heaps turned blue. In heaps containing 20 g. sodium bicarbonate per ton of salt the blue colouration appeared after 6 days and increased gradually in intensity. The salt in heaps which contained 250 g. basic magnesium carbonate and 20 g. potassium ferrocyanide per ton of salt remained colourless after 3 months even where the salt was in contact with pieces of rusted iron.

What we claim is:

1. A process for making a non-caking and color-inhibited ground sodium chloride salt which comprises uniformly distributing in said salt (1) an anti-caking agent selected from the group consisting of alkali metal ferrocyanides and ferricyanides at the rate of from 0.2 to 200 grams per ton of salt and (2) a color-inhibiting agent selected from the group consisting of hydroxides of alkaline earth metals, magnesium and aluminum at the rate of 50 to 500 grams per ton of salt.

2. A process for making a non-caking and color-inhibited ground sodium chloride salt which comprises uniformly distributing in said salt (1) an anti-caking agent selected from the group consisting of alkali metal ferrocyanides and ferricyanides at the rate of from 0.2 to 200 grams per ton of salt and (2) a color-inhibiting agent selected from the group consisting of hydroxides of alkaline earth metals, magnesium and aluminum at the rate of 50 to 500 grams per ton of salt, and passing carbon dioxide through the mixture.

3. A process according to claim 1 wherein said color-inhibiting agent is calcium hydroxide.

4. A process according to claim 1 wherein said color-inhibiting agent is magnesium hydroxide.

5. A process according to claim 1 wherein said color-inhibiting agent is a mixture of an alkaline earth metal hydroxide with a member of the class consisting of alkali metal carbonates and silicates and mixtures of such carbonates and silicates.

References Cited by the Examiner

UNITED STATES PATENTS

| | | | |
|---|---|---|---|
| 2,965,444 | 12/60 | Diamond | 23—89 |
| 3,009,775 | 11/61 | Ladenburg et al. | 23—89 |
| 3,036,884 | 5/62 | Kaufmann | 23—89 |

OTHER REFERENCES

"Sodium Chloride," book by D. W. Kaufmann, ACS Monograph Series, No. 145, pages 275, 276, 1960. Reinhold Publishing Co., New York, TN 900 K 36.

MAURICE A. BRINDISI, *Primary Examiner.*